Feb. 1, 1927.
G. SINIBALDI
1,616,006
DECOY FOR WILD FOWL AND THE LIKE
Filed Jan. 19, 1926
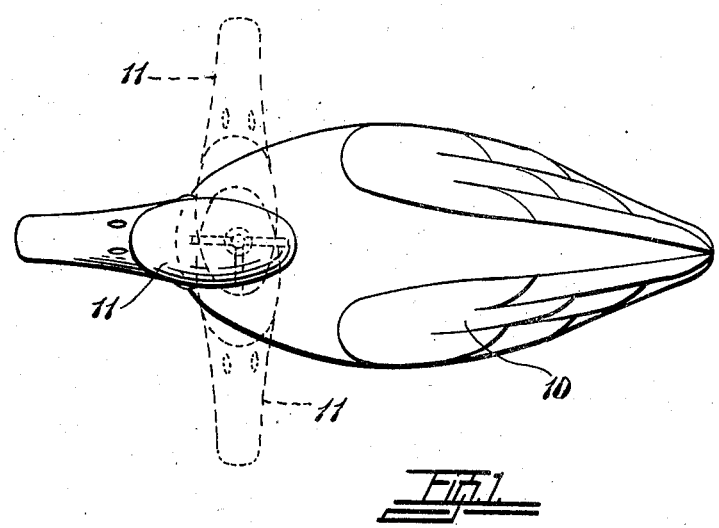
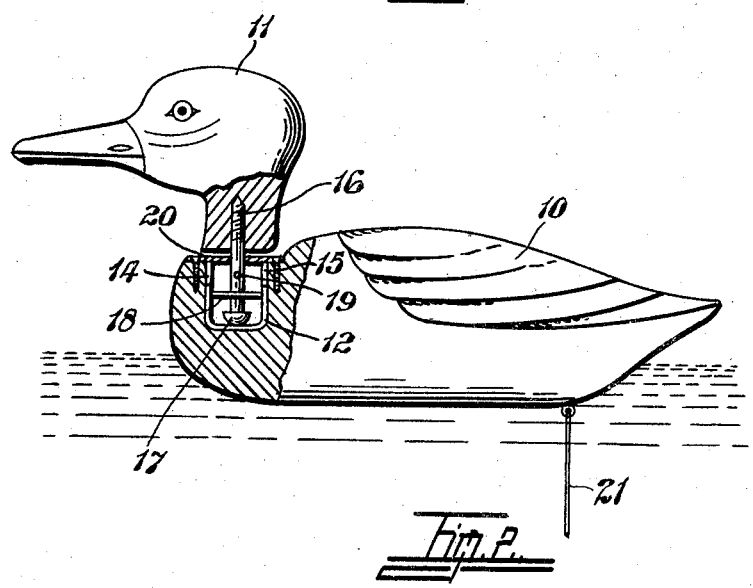
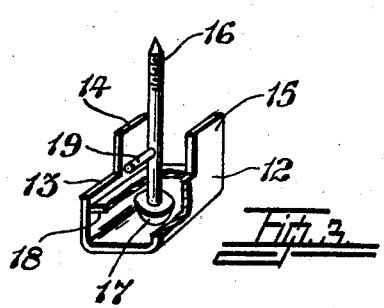
INVENTOR.
GABRIEL SINIBALDI.
BY *Fetherstonhaugh & Co.*
ATT'YS.

Patented Feb. 1, 1927.

1,616,006

UNITED STATES PATENT OFFICE.

GABRIEL SINIBALDI, OF ST. JOHN, NEW BRUNSWICK, CANADA.

DECOY FOR WILD FOWL AND THE LIKE.

Application filed January 19, 1926. Serial No. 82,342.

This invention relates to improvements in decoys for wild fowl and the like and the objects of the invention are to provide a decoy having a life-like movement of the head while floating on the surface of the water.

Further objects are to provide a decoy in which the head is automatically operable by wind when the device is floating on the water or by the movement of the water.

A further object is to provide an improved decoy with a life-like movement of the head, which can be manufactured and placed on the market at a very low cost and whereby, generally speaking, more satisfactory results are obtained.

With the foregoing and other objects in view, the invention consists essentially of a bearing plate in the body of the decoy and a shank or pin in the detachable head of the decoy adapted to rotatably engage with said plate, and means formed on the pin and the plate for limiting the travel of the rotary movement of the head.

Referring now to the drawings, in which like characters of reference indicate corresponding parts in each figure—

Figure 1 is a plan view of the decoy, with dotted lines showing the movement of the head.

Figure 2 is a side elevation, partly in section, showing the mounting of head in the body.

Figure 3 is a perspective view of the mounting for the head.

Referring more particularly to the drawings, in which a preferred example of my invention is illustrated, 10 designates the body of the decoy, here shown as representing a duck, with a detachable head 11. As is well known the decoy may be constructed of any suitable material that will float on the surface of water, such as wood or the like.

For imparting a life-like movement automatically to the head, which is the essential feature of my invention, I provide in the body 10 of the decoy a plate 12 substantially U-shaped and cut out as at 13 to form on one end at each side the upwardly projecting lugs 14 and 15. This plate is inserted in a suitable cut-out or recess adjacent the end of the body 10 and is designed to register with the detachable head 11.

Within the head 11 is a threaded shank or pin 16 extending downwardly therebeyond and formed at its lower end with a substantially ball-shaped portion 17 adapted to rest on the bottom of the U-shaped plate which forms a bearing therefor.

Spaced from the bottom of this plate 12 and substantially midway thereof is a reinforcing plate 18 through which the pin 16 extends.

To limit the travel of the head of the decoy thus rotatably mounted, so that it will maintain its life-like movement, I provide the pin 16 with a stop-pin 19 adapted to engage with each of the lugs 14 and 15 whereby the head of the decoy can only rotate to a predetermined point on either side.

Above the plate 18, forming a cover therefor, is another plate 20 fixedly secured in the body portion 10 by screws or any other suitable means, while 21 is the usual anchor connection for the decoy.

From the foregoing it will be seen that when the decoy is placed on the surface of the water in well known manner and anchored, the movement of the water or the wind will cause the rotatably mounted head to move to right and left in the most natural manner.

As many changes could be made in the above construction and many apparently widely different embodiments of my invention, within the scope of the claim, constructed without departing from the spirit or scope thereof, it is intended that all matter contained in the present specification and the accompanying drawings shall be interpreted in an illustrative and not in a limiting sense.

What I claim as my invention is:

In a decoy duck of the character described, the combination with the head and body of a U-shaped plate countersunk in the body and formed with partially cut out sides adapted to provide lugs, a shank embedded in the head and ball-shaped at the opposite end to turnably engage with the U-shaped plate, an apertured reinforcing plate intermediately arranged in the U-shaped plate and adapted to operatively engage with said shank, and a pin on the shank to engage with said lugs to limit the travel of the head in either direction.

In witness whereof I have hereunto set my hand.

GABRIEL SINIBALDI.